US008756911B1

(12) United States Patent
Liang

(10) Patent No.: US 8,756,911 B1
(45) Date of Patent: Jun. 24, 2014

(54) TURBINE EXHAUST CYLINDER AND STRUT COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 400 days.

(21) Appl. No.: 13/297,318

(22) Filed: Nov. 16, 2011

(51) Int. Cl.
*F02K 3/00* (2006.01)

(52) U.S. Cl.
USPC ............... 60/269; 60/39.83; 60/806; 415/116

(58) Field of Classification Search
USPC ......... 60/39.83, 269, 785, 805, 806; 415/116, 415/117, 208.1, 208.2, 211.2
See application file for complete search history.

(56) References Cited

U.S. PATENT DOCUMENTS

| | | | | | |
|---|---|---|---|---|---|
| 2,487,842 | A | * | 11/1949 | Whiteman et al. | 415/176 |
| 5,351,476 | A | * | 10/1994 | Laborie et al. | 60/785 |
| 5,743,493 | A | * | 4/1998 | McCaughan | 244/130 |
| 6,282,881 | B1 | * | 9/2001 | Beutin et al. | 60/39.08 |
| 7,766,609 | B1 | * | 8/2010 | Liang | 415/138 |
| 2009/0314004 | A1 | * | 12/2009 | Van Der Woude | 60/785 |

* cited by examiner

*Primary Examiner* — Hoang Nguyen
(74) *Attorney, Agent, or Firm* — John Ryznic

(57) ABSTRACT

A turbine exhaust cylinder for an industrial gas turbine engine with an external blower that delivers cooling air to a heat shield jacket surrounding an outer diameter cylinder to provide impingement cooling for the cylinder. Spent impingement cooling air is collected as passed through a space formed between a fairing and a strut to provide cooling to these parts. The cooling air then provides cooling for the inner diameter cylinder before being discharged into the turbine exhaust gas or out from the turbine exhaust cylinder.

6 Claims, 5 Drawing Sheets

TURBINE EXHAUST CYLINDER AND STRUT COOLING

CROSS-REFERENCE TO RELATED APPLICATIONS

None

GOVERNMENT LICENSE RIGHTS

None.

BACKGROUND OF THE INVENTION

1. Field of the Invention

The present invention relates generally to an industrial gas turbine engine, and more specifically to a turbine exhaust cylinder cooling of an industrial gas turbine engine.

2. Description of the Related Art Including Information Disclosed Under 37 CFR 1.97 and 1.98

In a gas turbine engine, such as a large frame heavy duty industrial gas turbine engine used to produce electric power, a hot gas stream is passed through a multiple stage turbine to drive a compressor and an electric generator. The turbine exhaust is channeled through a turbine exhaust casing to safely discharge the hot exhaust gas out from the engine and surrounding environment. The turbine exhaust gas is still rather hot and can erode parts of the engine downstream from the turbine. The turbine exhaust casing is supported by a number of struts that pass through fairings that have an airfoil shape. FIG. 1 shows a prior art engine with a turbine exhaust casing in which a strut 14 passing through a fairing 18. The last stage turbine rotor blade 11 rotates along with a rotor disk 12. An engine casing 13 supports the struts 14 and fairings 18. A cover plate 15 enclosed the space. A tie rod 16 connects the casing 13 to an outer diameter (OD) cylinder 27. An inner diameter (ID) cylinder 19 is located inward of the OD cylinder 27 and together forms a flow path for the turbine exhaust. A man-way 20 is formed between an exhaust cylinder 21 and an enclosure 22. The engine center line is labeled (C.L.) in FIG. 1. In this embodiment, no cooling is provided for the fairing 18 and struts 14

FIG. 2 shows a front view of the turbine exhaust casing support with the casing 13 supporting six struts 14 that each pass through a separate fairing 18. The inner ends of the struts 14 are secured to a bearing housing 24. The turbine exhaust gas flow path is formed between the inner diameter cylinder 19 and the outer diameter cylinder 27 and flows around the fairing 18.

FIG. 3 shows an embodiment in which the struts 14 and the fairings 18 are cooled by passing ambient air through the fairings 18. Ambient cooling air is drawn into the exhaust casing through the cover plate 15 and then flows through the space formed between the struts 14 and the fairings 18. There are six cover plates 15 open with one cover plate 15 for each of the struts 14 and fairings 18. During engine operation, the flow path pressure ID of the blade exhaust cylinder junction is lower than the ambient pressure. Cooling air is sucked in due to this pressure differential. At a 100% loading condition, the maximum delta pressure is around 1.0 psi. Such low pressure differential is not enough to induce a large amount of ambient cooling air into the exhaust cylinder to provide adequate cooling for the struts and casing. At some operational point, the delta pressure is even lower than 1.0 psi. As a result of inadequate available cooling, high temperature resistant materials are used for the struts and the casing in the design and therefore significantly increase the design cost.

BRIEF SUMMARY OF THE INVENTION

An industrial gas turbine engine with a turbine exhaust casing and struts that is cooled by pressurized cooling air supplied from an external blower that forces the pressurized cooling air through a passage that opens into the inner diameter cylinder and then passes through the fairings that surround the struts to provide cooling for these areas of the exhaust casing. The cooling air passes through the struts and fairings and then is discharged through the cover plates formed at each struts.

A heat shield jacket is secured over the outer cylinder of the turbine exhaust casing and fits between two adjacent struts. Each heat shield jacket includes an internal cooling air channel with impingement cooling holes to direct impingement cooling air to an outer surface of the outer cylinder to provide cooling against the hot exhaust gas flow. The impingement cooling air is collected and then passed through a cooling passage formed between the strut and the fairing to provide cooling for both. The cooling air is then discharged into the hot turbine exhaust gas flow or discharged form the turbine altogether.

A plurality of heat shield jackets surrounds the turbine outer cylinder of the exhaust casing and fits between adjacent struts. The heat shields provide cooling for the outer cylinder of the turbine exhaust casing from an inlet end to the outlet end.

DETAILED DESCRIPTION OF THE INVENTION

The present invention is a turbine exhaust casing cooling system for a large frame heavy duty industrial gas turbine engine, but could be used for other gas turbine engines. The turbine exhaust gas is passed through an exhaust casing formed by an outer diameter (OD) cylinder and an inner diameter (ID) cylinder in which struts extend between. The struts are surrounded by airfoil shaped fairings. Without adequate cooling, the cylinders and the struts and the fairings must be formed from high temperature resistant materials to reduce or eliminate thermal damage such as erosion that shorten the useful life of these parts.

Figure 1:
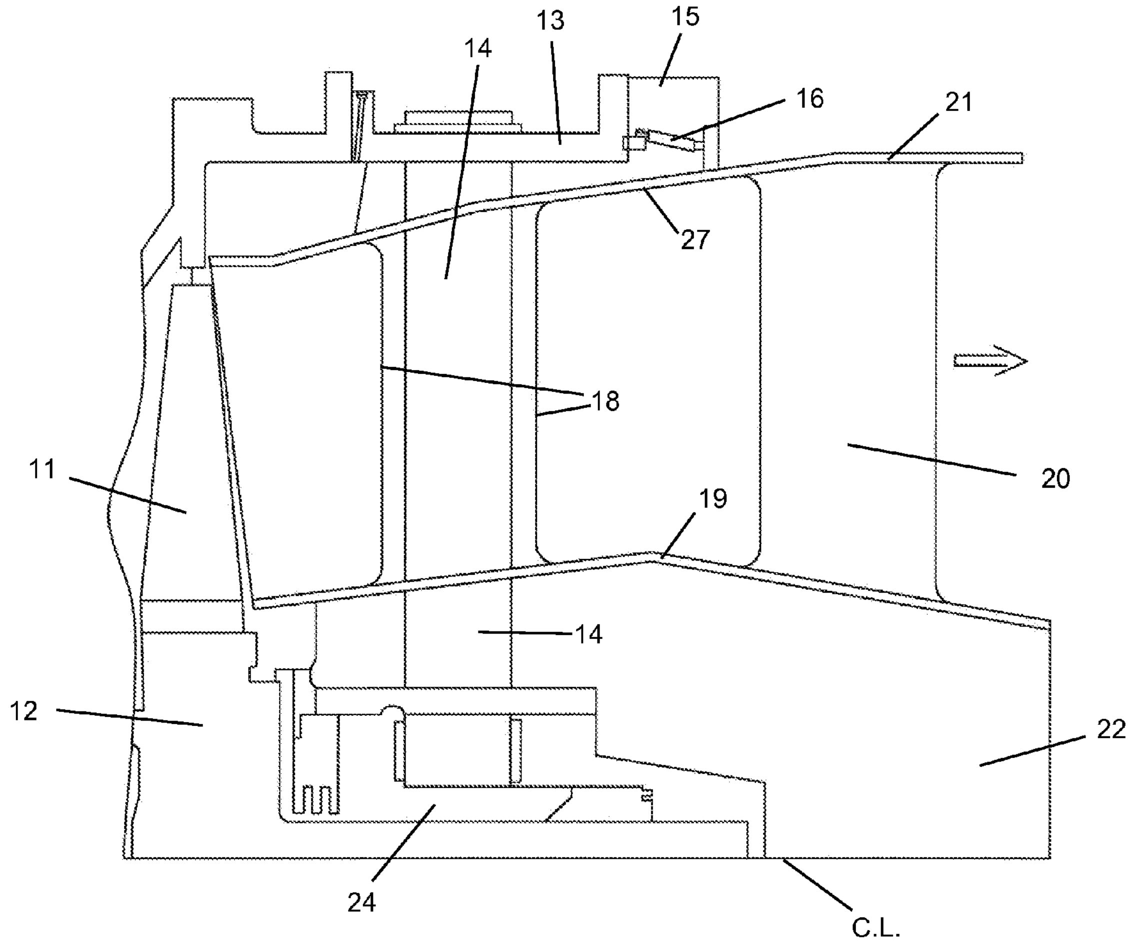
FIG 1 Prior Art
FIG. 1 shows a cross section side view of a turbine exhaust casing without cooling of the prior art.
Figure 2:
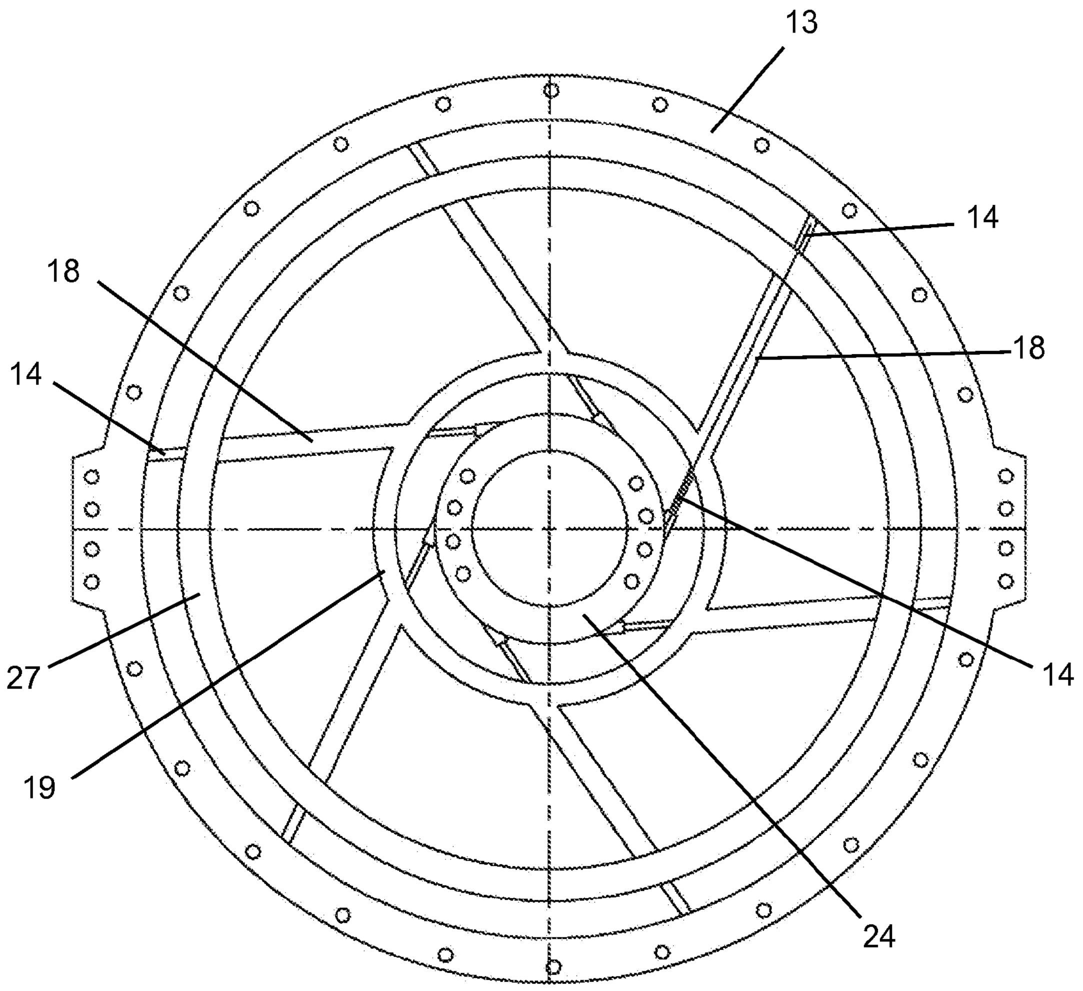
FIG 2 Prior Art
FIG. 2 shows a cross section front view of the turbine exhaust casing of FIG. 1 passing through the struts and fairings.
Figure 3:
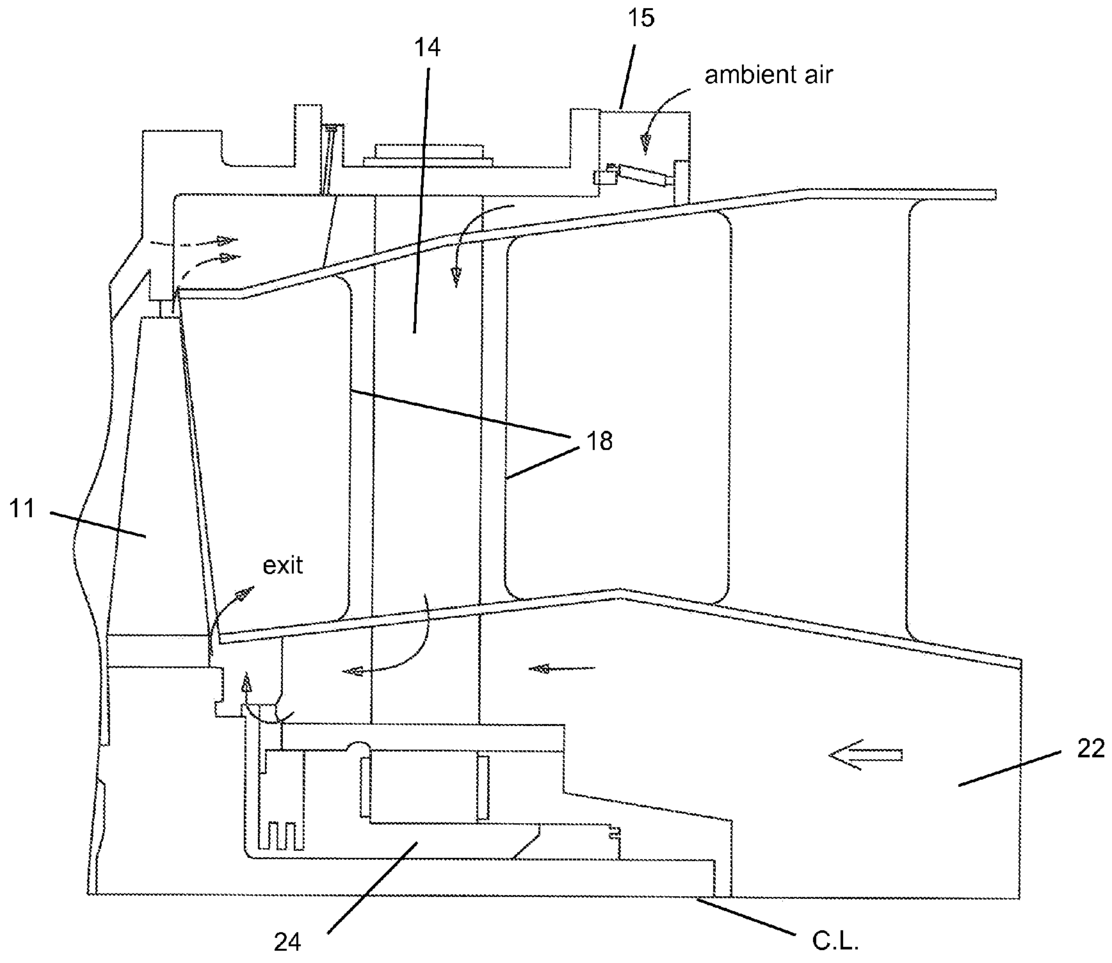
FIG 3 Prior Art
FIG. 3 shows a cross section side view of a turbine exhaust casing with passive cooling of the struts and fairings and OD and ID cylinders using ambient air of the prior art.
Figure 4:
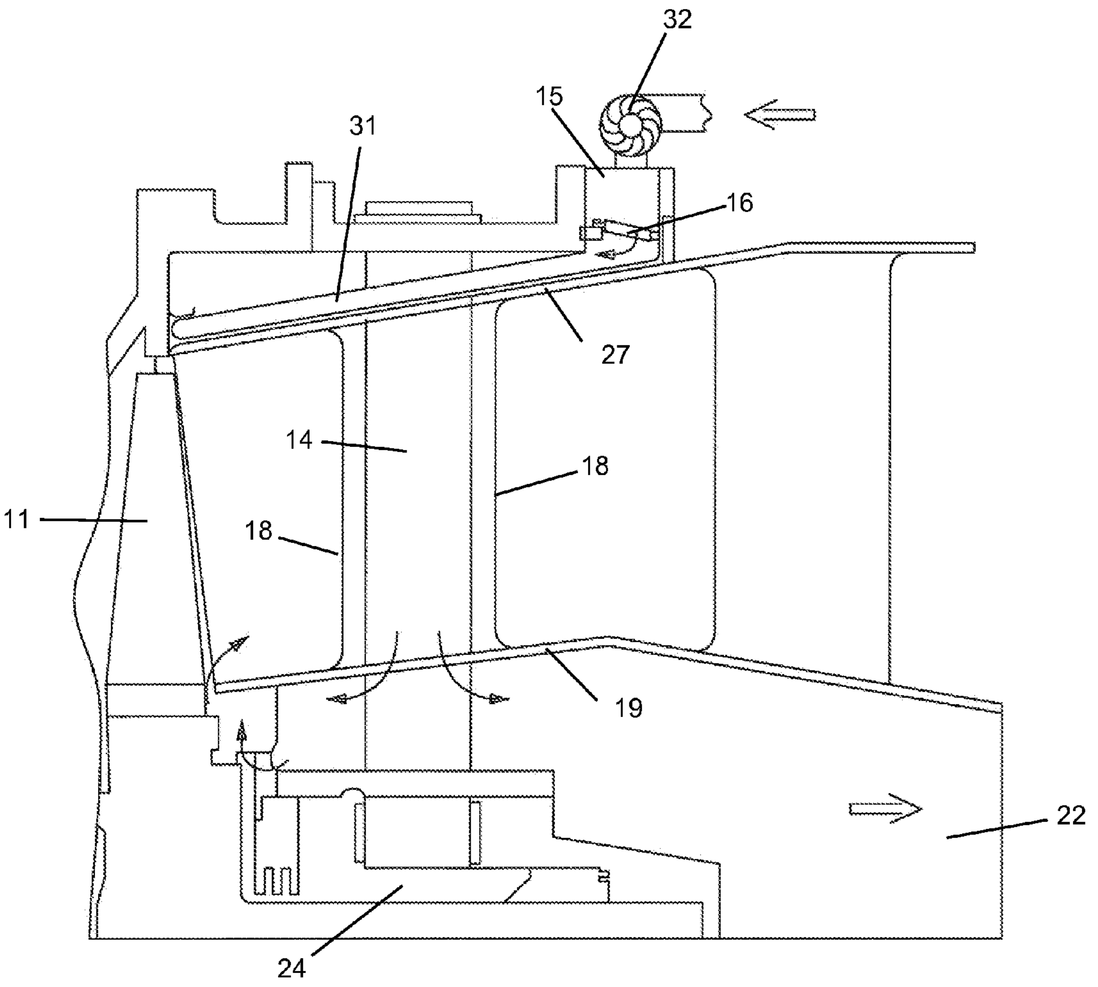
FIG. 4 shows a cross section side view of a turbine exhaust casing with pressurized cooling for the struts and fairings and the OD and ID cylinders and a heat shield jacket for impingement cooling of the outer cylinder of the present invention.

FIG. 4 shows a cross section side view of the present invention that includes a last stage turbine rotor blade 11 with an OD cylinder 27 and an ID cylinder 19 forming a flow path for the hot exhaust gas from the turbine. A plurality of heat shield jackets 31 are secured over the OD cylinder 27 with each heat shield jacket positioned between adjacent struts 14. The heat shield jackets 31 provide impingement cooling to the outer surface of the OD cylinder 27 with the spent cooling air passed through the spaces formed between the struts 14 and the fairings 18. An external blower 32 is connected to a cooling air inlet section of each of the heat shield jackets 31. Cooling air from the blower passes through the heat shield jacket 31 and then through an arrangement of impingement cooling air holes 34 to provide backside impingement cooling of the OD cylinder 27. The spent impingement cooling air is then collected and passed through the spaces formed between the struts 14 and the fairings 18 to provide cooling for these parts. The cooling air from the struts and fairings then passes within the space inward of the ID cylinder 19 to provide cooling here and is then discharged into the turbine exhaust or from the turbine completely through a turbine enclosure 22.

Figure 5:
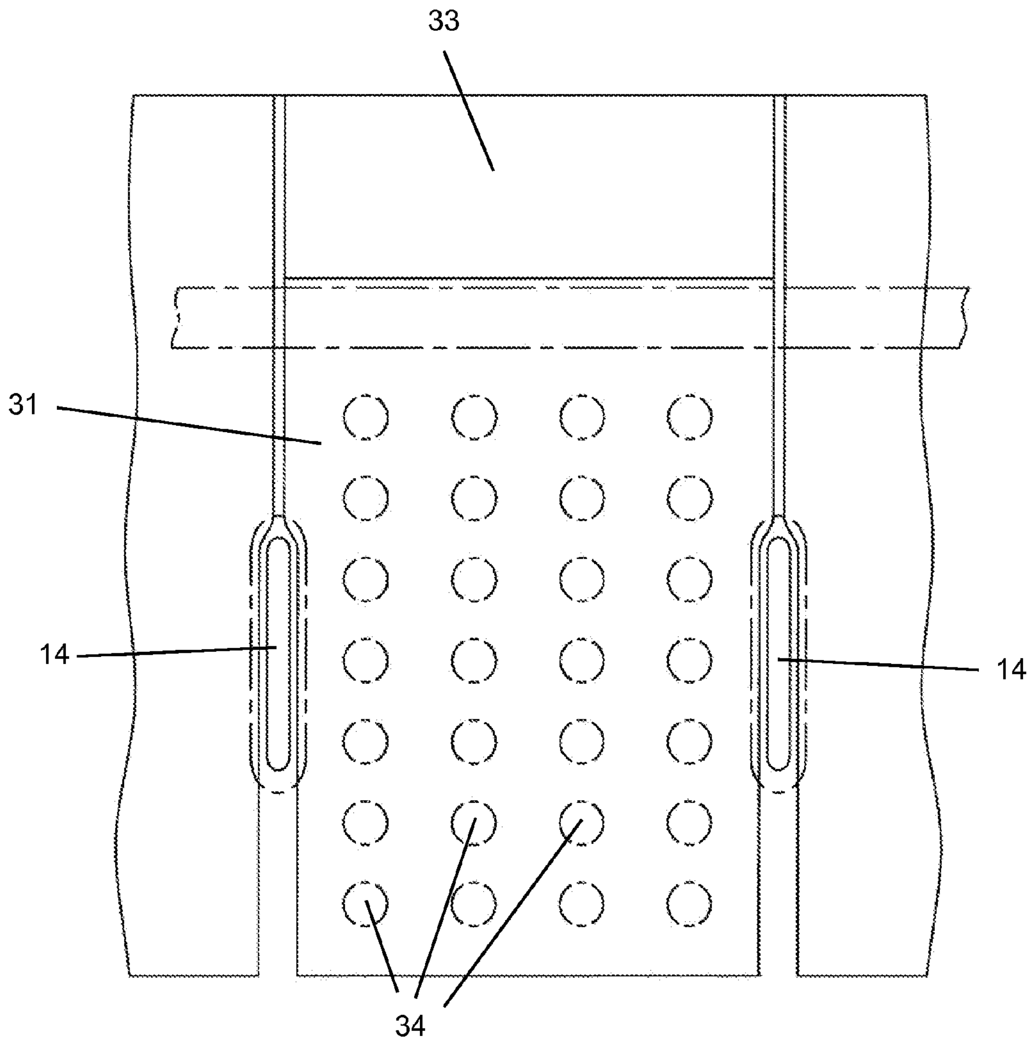
FIG. 5 shows a top view of one of the heat shield jackets of the present invention positioned between adjacent struts.

FIG. 5 shows a top view of one of the heat shield jacket 31 and includes a cooling air inlet 33 and an arrangement of impingement cooling holes 34. The heat shield jacket 31 fits between two adjacent struts 14 and the fairings 18. The heat shield jacket has a rectangular shape when looking from a top view with straight sides and ends, but has an annular shape when looking from the front or back end so that a number of jackets 31 can be used to fully encircle the outer diameter cylinder of the turbine exhaust cylinder. The heat shield jacket 31 is also used to block the radiation heat from the OD cylinder 27 to the turbine exhaust casing 13 which reduces the casing metal temperature and distribution.

I claim the following:

1. An industrial gas turbine engine exhaust cylinder comprising:

an inlet end connected to receive a turbine exhaust gas flow and an outlet end;

an outer diameter cylinder and an inner diameter cylinder forming a flow path through the exhaust cylinder for the turbine exhaust gas;

a fairing having an airfoil shape extending from the outer diameter cylinder to the inner diameter cylinder;

a strut extending from an outer casing to an inner casing and passing through the fairing with a space formed between the fairing and the strut for cooling air to flow;

a heat shield secured over the outer diameter cylinder and positioned between two adjacent struts;

the heat shield having an internal cooling air channel with an inlet opening for cooling air and a plurality of impingement holes directed to discharge impingement cooling air to an outer surface of the outer diameter cylinder; and, a blower connected to the inlet opening of the heat shield to supply cooling air to the impingement holes.

2. The industrial gas turbine engine exhaust cylinder of claim 1, and further comprising:

the plurality of impingement cooling holes are connected to the space formed between the strut and the fairing such that spent impingement cooling air flows through the space to cool the fairing and the strut.

3. The industrial gas turbine engine exhaust cylinder of claim 1, and further comprising:

the heat shield jacket has a rectangular shape from a top view and an annular shape from a front view.

4. The industrial gas turbine engine exhaust cylinder of claim 1, and further comprising:

the turbine engine exhaust cylinder includes a plurality of struts; and, an equal number of heat shield jackets positioned between the struts in an annular arrangement that fully covers the outer diameter cylinder.

5. The industrial gas turbine engine exhaust cylinder of claim 4, and further comprising:

each heat shield jacket is connected to a separate blower.

6. The industrial gas turbine engine exhaust cylinder of claim 1, and further comprising:

the blower is connected on an aft end of the heat shield jacket and the cooling air flows forward within the jacket.

* * * * *